United States Patent [19]

Fuchs et al.

[11] Patent Number: 4,701,373

[45] Date of Patent: Oct. 20, 1987

[54] DIFFICULTLY FLAMMABLE VENEERED OR COATED EXTRUDED BOARDS

[75] Inventors: Fritz-Reichard Fuchs, Reutlingen; Horst Staendeke, Lohmar, both of Fed. Rep. of Germany

[73] Assignee: Hoechst Aktiengesellschaft, Frankfurt am Main, Fed. Rep. of Germany

[21] Appl. No.: 915,493

[22] Filed: Oct. 6, 1986

Related U.S. Application Data

[62] Division of Ser. No. 667,580, Nov. 2, 1984, abandoned.

[30] Foreign Application Priority Data

Nov. 5, 1983 [DE] Fed. Rep. of Germany ....... 3340080
May 5, 1984 [DE] Fed. Rep. of Germany ....... 3416662

[51] Int. Cl.$^4$ .................. C08K 9/10; C32B 21/02; C32B 21/14; C32B 23/16
[52] U.S. Cl. ................ 428/326; 428/327; 428/407; 428/528; 428/529; 428/921; 428/425.3; 523/205; 525/936; 264/122
[58] Field of Search ................. 428/407, 326; 524/14, 524/416, 417; 525/936; 523/205

[56] References Cited

U.S. PATENT DOCUMENTS

| | | | |
|---|---|---|---|
| 4,008,214 | 2/1977 | Sobolev et al. | 524/14 |
| 4,012,558 | 3/1977 | Wurman | 524/14 |
| 4,467,056 | 8/1984 | Staendeke et al. | 524/416 |
| 4,547,429 | 10/1985 | Greiner et al. | 428/407 |

*Primary Examiner*—Carman J. Seccuro
*Attorney, Agent, or Firm*—Connolly and Hutz

[57] ABSTRACT

The disclosure relates to difficulty flammable wooden articles, especially chip boards comprising solid and pipe boards, prepared by extrusion from wooden chips and/or woody fibrous materials. The articles contain as a flame-retarding addend a product of (a) 50 to 99.5 weight % of a flame-retarding agent physically and chemically stable under extrusion conditions, preferably 75 to 99.5 weight % of a pulverulent, free-flowing ammonium polyphosphate of the general formula

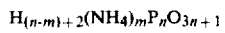

$$H_{(n-m)+2}(NH_4)_m P_n O_{3n+1}$$

in which n stands for a whole number with an average value of about 20 to 800 and the ratio of m/n is about 1, and (b) about 0.5 to 50 weight % of a cured water-insoluble artificial resin encapsulating the individual particles of the flame-retarding agent or ammonium polyphosphate.

The disclosure also relates to difficulty flammable boards veneered with wood or a laminate.

7 Claims, No Drawings

DIFFICULTLY FLAMMABLE VENEERED OR COATED EXTRUDED BOARDS

Cross-Reference

This application is a division of application Serial No. 667,580, filed Nov. 2, 1984, now abandoned, by Fritz-Reichard Fuchs, and Horst Staendeke for Difficulty Flammable Extruded Articles, Especially Extruded Boards, and a Process for Making Them.

The present invention relates to difficultly flammable wooden articles, especially chip boards comprising solid and pipe boards, prepared by extrusion from wooden chips and/or woody fibrous materials, and to a process for making these articles, especially extruded boards. The invention also relates to the use of these chip boards for making difficultly flammable boards veneered with wood or a laminate, to those difficultly flammable boards as such, and to their manufacture.

The following products are referred to by John W. Lyons in "The Chemistry and Uses of Fire Retardants" (Wiley Interscience New York, 1970, pages 122 et seq) as being flame-retarding agents suitable for use in making difficultly flammable chip boards:

monoammonium phosphate or diammonium phosphate, optionally used in combination with a urea-/formaldehyde resin;

magnesium chloride or magnesium bromide used in combination with magnesium oxide;

chloroparaffines used in combination with antimony (III) oxide.

Further flame-retarding agents imparting flame-retardant properties to chip boards have been described, namely:

reaction products of colemanite with a mineral acid, such as sulfuric acid or phosphoric acid (cf. DE-OS No. 29 33 755 and DE-OS No. 30 44 861);

a melamine phosphate (cf. U.S. Pat No. 4,080,501);

a water-soluble ammonium polyphosphate (cf. U.S. Pat. No. 3,939,107), and mixtures of PVC, ammonium polyphosphate and a urea/formaldehyde resin or phenol/formaldehyde resin (cf. JP No. 73 213 46; briefly discussed in Chemical Abstracts 81, 4837y).

As has been found, these flame-retardant agents can be used for imparting flame-retardant properties to flat chip boards only, as the temperature and pressure conditions prevailing during extrusion do not permit using them for imparting flame-retardant properties to extruded wooden articles, especially chip boards.

A process for treating chips of wood or other vegetable origin with a binder and/or impregnating agent for the purpose of making boards or other articles therefrom has been disclosed in DE-PS No. 12 24 917. Reference is also made therein to the addition of a pulverulent wood preservative and flame-retarding agent, which however were found to distribute irregularly and to impair the bonding strength and mechanical strength of the final product. Needless to say therefore this has failed to gain commercial interest.

It has however been suggested in DE-PS No. 12 24 917 that the chips should be brought into contact for a short while with a liquor being a solution, dispersion or emulsion of the particular agent. This makes it naturally necessary for the chips to be extensively freed from liquid phase in a centrifuge and dried, prior to processing, which is disadvantageous. A typical liquor is, e.g. an aqueous solution of monoammonium phosphate as a flame-retarding agent.

DE-OS No. 29 49 537 on the other hand discloses a particulate agent impeding the combustibility of combustible substances, such as polyurethane or polyurethane foams, based on a free-flowing pulverulent ammonium polyphosphate of which the individual particles are encapsulated in a cured water-insoluble polycondensation product of melamine and formaldehyde. Nothing has been disclosed however as to the manner of incorporating and processing the agent in a material to be given flame-retardant properties.

It is therefore an object of this invention to inter alia provide a process for imparting flame-retardant properties to wooden articles extruded from chips and/or woody fibrous material, the process permitting existing preconceptions to be set aside and prior art deficiencies to be avoided.

The invention relates more particularly to difficultly flammable wooden articles, especially chip boards comprising solid and pipe boards, prepared by extrusion from wooden chips and/or woody fibrous materials, the articles containing as a flame-retarding addend a product of (a) 50 to 99.5 weight % of a flame-retarding agent being physically and chemically stable under extrusion conditions and (b) about 0.5 to 50 weight % of a cured water-insoluble artificial resin encapsulating the individual particles of the flame-retarding agent the wooden articles and more especially the chip boards containing the flame-retarding agent in a concentration of about 5 to 50 weight %, based on the dry wooden chips and/or woody fibrous materials.

The invention also relates to difficultly flammable wooden articles, especially chip boards comprising solid and pipe boards prepared by extrusion from wooden chips and/or woody fibrous materials, the articles containing as a flame-retarding agent a product of (a) 75 to 99.5 weight % of a pulverulent, free-flowing ammonium polyphosphate of the general formula $$H_{(n-m)+2}(NH_4)_m P_n O_{3n+1}$$

in which n stands for a whole number with an average value of about 20 to 800 and the ratio of m/n is about 1, and (b) about 0.5 to 25 weight % of a cured water-insoluble artificial resin encapsulating the individual ammonium polyphosphate particles, the articles and more especially the chip boards containing the flame-retarding agent in a concentration of about 5 to 50 weight %, based on the dry wooden chips and/or fibrous materials.

Speaking generally, the flame-retarding agent consists of articles having a mean size of about 0.03 to 0.08 mm and a degree of condensation with the index n representing an average value of 450 to 800, determined by the terminal group titration process (van Wazer, Griffiter and McCullougen, Anal. Chem. 26, page 1755 (1954)). The water-insoluble, cured artificial resin encapsulating the flame-retarding agent is preferably a polycondensation product of melamine and formaldehyde. The uncured polycondensation product preferably constitutes a powder of which a 50% aqueous solution has a dynamic viscosity of 20–50 mPa.s (at 20° C.), a pH-value of 8.8 to 9.8 (at 20° C.) and a density of 1.21 to 1.225 g/ml (at 20° C.). The water-insoluble, cured artificial resin can also be selected from the polycondensation products of a polyol and an isocyanate and/or polyisocyanate, or from the polycondensation products of an isocyanate and/or polyisocyanate. An epoxide resin can also be used as the water-insoluble cured artificial resin. The water-insoluble, cured artificial resin can finally be selected from the polycondensation products of an aromatic hydroxy compound, e.g. phenol or resorcinol, and formaldehyde.

The invention also relates to a process for making difficultly flammable wooden articles, especially chip boards, which comprises: admixing a substance selected from wooden chips, woody fibrous materials or mixtures thereof with about 5 to 50 weight %, based on the dry wooden chips and/or woody fibrous materials, of a flame-retarding addend consisting of
(a) 50 to 99.5 weight % of a flame-retarding agent being physically and chemically stable under extrusion conditions and
(b) about 0.5 to 50 weight % of an at least partially cured water-insoluble artificial resin encapsulating the individual particles of the flame-retarding agent, and also with one or more binders and optionally hardeners and/or further addends, such as a lubricant; extruding the whole by loosely introducing it into a screw extruder and making it therein into extruded wooden articles, especially into board-like strands with the aid of a press moving to and fro between heatable plates.

In accordance with a further feature of this invention, the process for making difficultly flammable wooden articles, especially chip boards, comprises: admixing a substance selected from wooden chips, woody fibrous materials or mixtures thereof with about 5 to 50 weight %, based on the dry wooden chips and/or woody fibrous material, of a flame-retarding agent consisting of
(a) 75 to 99.5 weight % of a pulverulent, free-flowing ammonium polyphosphate of the general formula

$H_{(n-m)+2}(NH_4)_m P_n O_{3n+1}$ in which n stands for a whole number with an average value of about 20 to 80 and the ratio of m/n is about 1, and
(b) about 0.5 to 25 weight % of an at least partially cured, water-insoluble artificial resin encapsulating the individual ammonium polyphosphate particles, and also with one or more binders and optionally hardeners or further addends such as a lubricant; extruding the whole by loosely introducing it into a screw extruder and making it therein into wooden articles, especially into board-like strands, with the aid of a press moving to and fro between heatable plates.

Extrusion processes have been described in DE-PS No. 949,902, DE-PS No. 973,801 and DE-AS No. 11 98 545, for example. These are processes wherein the extruder is operated under a mean moulding pressure of generally 0.5 to 2.0 N/mm², and the heating plates are maintained at a temperature of about 100 to 250° C. Certainly, it is an unexpected result that the flame-retardant agent of this invention is fully active, even under these conditions.

Preferred features of the present process provide for a urea/formaldehyde glue to be used as the binder and for a modified ammonium chloride solution or optionally for a special hardener to be used as the hardener, for the wooden chips; a useful special hardener is more especially the commercially available hardener 527 (liquid) of BASF Aktiengesellschaft, Ludwigshafen, Federal Republic of Germany. An isocyanate, preferably based on diphenylmethane-diisocyanate (MDI) can also be used as the binder.

The following statements are intended further to illustrate the present invention.

The artificial resin encapsulating the flame-retarding agent is incompletely cured to provide an additional reaction potential improving the incorporation of the flame-retarding agent into the chip mixture. It is basically possible for the ammonium polyphosphate as a flame-retarding agent to be replaced by another suitable agent microencapsulated by coating it with a cured, water-insoluble artificial resin, and for such microencapsulated agent to be used for making difficultly flammable wooden articles, especially chip boards by extrusion in accordance with this invention.

The present invention thus also relates to the use of the present chip boards for making difficultly flammable boards veneered with wood or a laminate using a special binder or glue. The wood-veneered boards preferably have a difficultly flammable lacquer or varnish applied to their surface.

The invention thus also relates to difficultly flammable coated chip boards, especially wood-veneered or laminated boards, consisting of:
(a) a chip board prepared by extrusion from wooden chips and/or woody fibrous materials and containing about 5 to 50 weight %, based on the wooden chips and/or woody fibrous materials respectively, of a flame-retarding addend comprised of
(1) 50 to 99.5 weight % of a flame-retarding agent being physically and chemically stable under extrusion conditions, and
(2) about 0.5 to 50 weight % of a cured, water-insoluble artificial resin encapsulating the individual particles of the flame-retarding agent, one or more binders and optionally hardeners and/or further addend, such as a lubricant,
(b) a covering or sealing veneer of wood or laminated sheet material glued to the chip board by means of a special binder, and optionally
(c) a surface layer of a difficultly flammable varnish or lacquer.

The invention provides more particularly difficultly flammable coated chip boards, especially wood-veneered or laminated boards consisting of:
(a) a chip board prepared by extrusion from wooden chips and/or woody fibrous material, and containing about 5 to 50 weight %, based on the wooden chips and/or woody fibrous material, of a flame-retarding agent comprised of
(1) 75 to 99.5 weight % of a pulverulent, free-flowing ammonium polyphosphate of the general formula

$H_{(n-m)+2}(NH_4)_m P_n O_{3n+1}$ in which n stands for a whole number with an average value of about 20 to 800 and the ratio of m/n is about 1, and
(2) about 0.5 to 25 weight % of a cured, water-insoluble artificial resin encapsulating the individual ammonium polyphosphate particles, one or more binders and optionally hardeners and/or further addends such as a lubricant,
(b) a covering or sealing veneer of wood or laminated sheet materials glued to the chip board by means of a special binder and optionally (c) a surface layer of a difficultly flammable varnish or lacquer.

Further preferred features of the difficultly flammable coated chip boards of this invention provide:

(a) for the flame-retarding addend or agent to consist of particles with a mean particle size of about 0.03 to 0.08 mm,
(b) for the index n to be a whole number with an average value of 450 to 800,
(c) for the water-insoluble, cured artificial resin to be a polycondensation product of melamine and formaldehyde,
(d) for the water-insoluble, cured artificial resin to be a polycondensation product of a polyol and an isocyanate and/or polyisocyanate,
(e) for the water-insoluble, cured artificial resin to be a polycondensation product of an isocyanate and/or polyisocyanate,
(f) for the water-insoluble, cured artificial resin to be an epoxide resin,
(g) for the water-insoluble, cured artificial resin to be a polycondensation product of an aromatic hydroxy compound selected e.g. from phenol or resorcinol, and formaldehyde.

Veneers not rendered flame-retardant, applied in conventional manner with the use of a binder based on a urea/formaldehyde resin or polyvinyl acetate were found in burn-up tests to detach and burn-up completely. After considerable experimental work, it was possible to provide a solution for the problem.

A further feature of this invention therefore provides for use to be made of a condensation product based on phenol/melamine/urea-formaldehyde, or of an isocyanate, as a special binder for applying the veneer of wood or laminate to the chip board. A typical special binder composition should preferably contain KAURAMIN 541 (this is a registered Trade Mark of BASF Aktiengesellschaft, Ludwigshafen, Federal Republic of Germany).

Boards veneered with wood finally have a transparent, difficultly flammable one-component lacquer or varnish applied to their surface. Typical of such lacquer or varnish are more especially FLAMMEX S 44 (this is a registered Trade Mark of Jordan Lacke GmbH & Co. KG, Würzburg, Federal Republic of Germany) and Rölite one-process lacquer 280 sgl—also a one-component lacquer (a product of Zimmermann & Fechter GmbH, Lackfabrik, Frankfurt, Federal Republic of Germany).

The compressed laminated board is, e.g. RESOPAL F (this is a registered Trade Mark of Resopal Werk H. Römler GmbH, Gross-Umstadt, Federal Republic of Germany), whilst the veneers can be selected from practically all kinds of hardwood and soft wood veneers.

The difficultly flammable veneered or coated extruded boards find widespread uses, e.g. as acoustics boards, wall boards, panels, partition walls, etc.

The following Examples illustrate the invention, Examples 1 to 7 and Tables 1 and 2 relating to the extruded boards and Examples 8 to 11 and Table 3 relating to the veneered or coated extruded boards.

EXAMPLE 1

(Prior art)

100 kg dry wooden chips,
25 kg flame-retardant agent based on colemanite (cf. DE-CS No. 30 44 861, Example 4),
9.1 kg KAURIT glue 365 liquid (this is a registered Trade Mark of BASF Aktiengesellschaft, Ludwigshafen, Federal Republic of Germany), and
1.8 kg hardener 29-solution (a product of BASF Aktiengesellschaft, Ludwigshafen, Federal Republic of Germany) in the form of a 15% aqueous solution were intensively mixed and the mixture was introduced into a screw extruder (cf. DE-PS No. 973 801 or DE-AS No. 11 98 545). The temperature of the heating plates was 130° C.

It was necessary for the experiment to be arrested. The mixture in the extruder was found to solidify without a strand being extruded.

EXAMPLE 2

(Prior art)

The procedure was as in Example 1 save that 30 kg flame-retarding agent was used and the temperature of the heating plates was 135° C.

It was necessary for the experiment to be discontinued for the reasons specified in Example 1.

EXAMPLE 3

(Prior art)

The procedure was as in Example 1 save that 30 kg flame-retarding agent was used and the temperature of the heating plates was 150° C.

It was necessary for the experiment to be discontinued for the reasons specified in Example 1.

EXAMPLE 4

(Prior art)

100 kg dry wooden chips,
10 kg boric acid
9.1 kg KAURIT-glue 365 liquid (this is a registered Trade Mark of BASF Aktiengesellschaft, Ludwigshafen, Federal Republic of Germany) and
1.8 kg hardener 29-solution (a product of BASF Aktiengesellschaft, Ludwigshafen, Federal Republic of Germany) in the form of a 15% aqueous solution were intensively mixed and the mixture was introduced into the screw extruder of Example 1. The temperature of the heating plates was 130° C.

It was necessary for the experiment to be discontinued for the reasons specified in Example 1.

EXAMPLE 5

100 kg dry wooden chips and
20 kg EXOLIT 422 (this is a registered Trade Mark of HOECHST Aktiengesellschaft, Frankfurt/Main, Federal Republic of Germany)
  this is a fine particulate, difficultly water-soluble ammonium polyphosphate of the formula $(NH_4PO_3)_n$, in which n is about 700; 99% of the ammonium polyphosphate particles have a size smaller than 45/$\mu$m were mixed in a mixer and a binder liquor consisting of
10.8 kg KAURIT-glue 365 (this is a registered Trade Mark of BASF Aktiengesellschaft, Ludwigshafen, Federal Republic of Germany)
3.0 kg water,
2.2 kg hardener 29-solution (a product of BASF Aktiengesellschaft, Ludwigshafen, Federal Republic of Germany) in the form of a 15% aqueous solution.

1.6 kg liquid hardener 527 (a product of BASF Aktiengesellschaft, Ludwigshafen, Federal Republic of Germany) and 0.8 kg wax emulsion MOBILCER 65 (this is a registered Trade Mark of Mobil Oil AG, Hamburg, Federal Republic of Germany)

was sprayed on to the mixture by means of a nozzle.

The whole was mixed for a further 2 minutes and then introduced into a screw extruder (cf. Example 1); the temperature of the heating plates was 170° C.

The resulting 23 mm pipe chip board had a very low mechanical strength warranting no further investigation.

EXAMPLE 6

(Invention)

100 kg dry wooden chips and 19 kg EXOLIT 456 (this is a registered Trade Mark of HOECHST AKTIENGESELLSCHAFT, Frankfurt/Main, Federal Republic of Germany)

this is the flame-retarding agent claimed in this invention, the individual ammonium polyphosphate particles having a cured, water-insoluble coating of a polycondensation product of melamine and formaldehyde applied thereto; the flame-retarding agent is prepared as described in DE-OS No. 29 49 537; the agent contains 29.5 weight % phosphorus and less than 0.5 weight % water-soluble matter at 25° C.

were mixed in a mixer and a binder liquor consisting of 10.8 kg KAURIT-glue 365 liquid (this is a registered Trade Mark of BASF Aktiengesellschaft, Ludwigshafen, Federal Republic of Germany), 3.0 kg water 2.2 kg hardener 29-solution (a product of BASF Aktiengesellschaft, Ludwigshafen, Federal Republic of Germany) in the form of a 15% aqueous solution 1.6 kg liquid hardener 527 (a product of BASF Aktiengesellschaft, Ludwigshafen, Federal Republic of Germany), and 0.8 kg wax emulsion MOBILCER 65 (this is a registered Trade Mark of Mobil Oil Aktiengesellschaft, Hamburg, Federal Republic of Germany)

was sprayed on to the mixture by means of a nozzle.

After a mixing period of a further 2 minutes, the whole was introduced into a screw extruder and made at a temperature of 170° C. into pipe chip boards 23 mm thick.

The results of the analytic investigations, mechanical tests and burning test are indicated in Tables 1 and 2 hereinafter.

EXAMPLE 7

(Invention)

The procedure was as in Example 6 save that 2.4 kg wax emulsion was used.

The results of the analytic investigations, mechanical tests and burning tests are indicated in Tables 1 and 2 hereinafter.

Examples 6 and 7 relating to the invention can be summarized as follows: the pipe chip boards made in accordance with this invention were unexpectedly found to comply with standard mechanical strength requirements (DIN No. 68 764) and burn-up specifications (DIN No. 4102 - class B 1; DIN stands for German Industrial Standard).

EXAMPLE 8

(Comparative Example)

A pipe chip board 23 mm thick prepared as described in Example 6, complying with the specification of burning class B 1, DIN No. 4102 was veneered under the following conditions using a one platen press:
Type of veneer: Koto
Glue composition
  100 parts by weight KAURIT 285 (this is a registered Trade Mark of BASF Aktiengesellschaft, Ludwigshafen, Federal Republic of Germany)
  10 parts by weight hardener-70 solution (this is a product of BASF Aktiengesellschaft, Ludwigshafen, Federal Republic of Germany) in the form of an aqueous 15% solution
  20 parts by weight rye flour (type 1370)
  8 parts by weight water
Pressing conditions: Temperature: 140° C.
  Period: 1.2 minutes
  Pressure: 6 bars
  Glue applied: 200–250 g/m$^2$
Surface treatment:
  Grinding with 140/180 K and lacquering/varnishing with FLAMMEX S 44 one-component lacquer (this is a registered Trade Mark of Jordan Lacke GmbH & Co. KG, Würzburg, Federal Republic of Germany); quantity applied: 120 g/m$^2$. Every second pipe was opened by providing a 4 mm wide slot in the visible surface area.

The results of the burning test are indicated in Table 3 hereinafter.

EXAMPLE 9

(Comparative Example)

The procedure was as in Example 8 save that the glue composition was replaced by white glue based on polyvinyl acetate.
Type of veneer: Koto
Glue: POLYTEX 307 (this is a registered Trade Mark of Zika, Chemische Fabrik, Pfullingen, Federal Republic of Germany)
Pressing conditions:
  Temperature: 140° C.
  Period: 2.5 minutes
  Pressure: 6 bars
  Glue applied: 250–300 g/m$^2$ The results of the burning test are indicated in Table 3 hereinafter.

EXAMPLE 10

(Invention)

The procedure was in Example 8 save that the glue liquor was replaced by the following glue composition:
Type of veneer: Pine, fir, oak, elm, teak, muténye
Glue composition:
  100 parts by weight KAURAMIN 541 (this is a registered Trade Mark of BASF Aktiengesellschaft, Ludwigshafen, Federal Republic of Germany)
  20 parts by weight rye flour (type 1370)
  4 parts by weight hardener-29 solution (a product of BASF Aktiengesellschaft, Ludwigshafen, Federal Republic of Germany) in the form of a 25% aqueous solution.
Pressing conditions:
  Temperature: 140° C.
  Period: 2 minutes Pressure: 6 bars
Glue applied: 200-250 g/m²
Surface treatment: Grinding with 140/180 K and lacquering/varnishing with FLAMMEX S 44 one-component lacquer (this is a registered Trade Mark) or Rölit one-process lacquer 280 sgl (this is a product of Zimmerman and Fechter GmbH, Lackfabrik, Frankfurt, Federal Republic of Germany).

Every second pipe was opened by providing an about 4 mm wide slot in the visible surface area.

The results of the burning tests are indicated in Table 3 hereinafter.

EXAMPLE 11

(Invention)

The procedure was as in Example 10 save that the wood veneer was replaced by a laminate veneer, RESOPAL F (this is a registered Trade Mark of Resopal Werk H. Römmler GmbH, Gross-Umstadt, Federal Republic of Germany).

The results of the burning test are indicated in Table 3 hereinafter.

TABLE 1

| Specimen | Analytic investigations and mechanical tests | | | | | |
| --- | --- | --- | --- | --- | --- | --- |
| | Density (kg/m³) | Phosphorus content (% P) | Water content (% H₂O) | Swelling after 1 hour (%) | Tensile strength[1] (N/mm²) | Flexural strength[2] (N/mm²) |
| Example 6 | 730 | 3.8 | 5.5 | 5.6 | 0.85 | 4.9 |
| Example 7 | 780 | 4.1 | 5.5 | 4.6 | 0.75 | 9.9 |
| Specifications DIN 68764 | no indication | no indication | no indication | no indication | 0.40 | 4.0 |

[1] parallel with respect to direction of preparation
[2] rectangular with respect to direction of preparation

TABLE 2

| Specimen | Burning shaft test (DIN 4102) | | | | |
| --- | --- | --- | --- | --- | --- |
| | Max. flame height (cm) | Max. smoke gas temperature (°C.) | Mean residual length (cm) | Smoke gas density [1] | Burning Class/ DIN 4102 |
| Example 6 | 80 | 129 | 27 | 26 | B 1 |
| Example 7 | 90 | 139 | 18 | 13 | B 1 |
| Specifications (DIN 4102) | <100 | <200 | >15 | no indication | |

[1] determined as minimum transmission in %

TABLE 3

| Specimen | Burning shaft test (DIN 4102) | | | |
| --- | --- | --- | --- | --- |
| | Veneer or laminate | Max. smoke gas temperature (°C.) | Mean residual length (cm) | Burning Class (DIN 4102) |
| Example 8 (Compar. Ex.) | Koto | >200 | 0 | B2 |
| Example 9 (Compar. Ex.) | Koto | 186 | 12 | B2 |
| Example 10 (Invention) | Pine | 148 | 21 | B1 |
| | Fir | 125 | 27 | B1 |
| | Teak | 147 | 17 | B1 |
| | Mutenye | 135 | 20 | B1 |
| | Elm | 131 | 16 | B1 |
| | Oak | 161 | 20 | B1 |
| Example 11 (Invention) | RESOPAL F | 128 | 20 | B1 |
| Specifications (DIN 4102) | no indication | <200 | >15 | |

We claim:

1. Difficulty flammable coated chip boards veneered with wood or a laminate consisting of
(a) a chip board prepared by extrusion from wooden chips and/or woody fibrous material, respectively, and containing about 5 to 50 weight %, based on the wooden chips and/or woody fibrous material of a flame-retarding agent comprised of (1) 50 to 99.5 weight % of a pulverulent, free-flowing ammonium polyphosphate of the general formula

$$H_{(n-m)+2}(NH_4)_m P_n O_{3n+1}$$

in which n stands for a whole number with an average value of about 20 to 800 and the ratio of m/n is about 1, consisting of particles with a mean size of about 0.03 to 0.08 mm, and (2) 0.5 to 50 weight % of a cured, water-insoluble synthetic resin selected from the group consisting of (A) a polycondensation product of a polyol and an isocyanate,
(B) a polycondensation product of a polyol and a polyisocyanate,
(C) a polycondensation product of an isocyanate and/or a polyisocyanate,
(D) a polycondensation product of an aromatic hydroxy compound and formaldehyde,
(E) an epoxide resin, encapsulating the particles of said ammonium polyphosphate, at least one substance selected from binders, hardeners and conventional addends, and (b) a covering or sealing veneer of wood or laminated sheet material glued to the chip board by means of a special binder.

2. Difficulty flammable coated chip boards as claimed in claim 1, wherein a layer of a difficulty flammable varnish or lacquer is applied to the surface of the covering or sealing veneer.

3. Difficulty flammable coated chip boards as claimed in claim 2 wherein the difficulty flammable varnish or lacquer is a transparent single component varnish or lacquer.

4. The method of making difficulty flammable boards, which comprises the steps of covering with a veneer of wood or laminated sheet material,
   a chip board prepared by admixing a substance selected from wooden chips, woody fibrous materials or a mixture thereof with about 5 to 50 weight %, based on the dry wooden chips and/or woody fibrous materials, of a flame-retarding addend consisting of
(a) 50 to 99.5 weight % of a pulverulent, free-flowing ammonium polyphosphate of the general formula $$H_{(n-m)+2}(NH_4)_m P_n O_{3n+1}$$

in which n stands for a whole number with an average value of about 20 to 800 and the ratio of m/n is about 1, consisting of particles with a mean size of about 0.03 to 0.08 mm and (b) about 0.5 to 50 weight % of a cured, water-insoluble synthetic resin selected from the group consisting of
   (A) a polycondensation product of a polyol and an isocyanate,
   (B) a polycondensation product of a polyol and a polyisocyanate,
   (C) a polycondensation product of an isocyanate and/or a polyisocyanate,
   (D) a polycondensation product of an aromatic hydyroxy compound and formaldehyde,
   (E) an epoxide resin, encapsulating the particles of said ammonium polyphosphate and also with at least one substance selected from binders, hardeners and conventional addends; extruding the whole by loosely introducing it into a screw extruder and making it therein into extruded wooden articles, with the aid of a press moving to and fro between heatable plates.

5. Difficultly flammable coated chip boards as claimed in claim 1, wherein the index n is a whole number with an average value of 450 to 800.

6. Difficultly flammable coated chip boards as claimed in claim 1, wherein the aromatic hydroxy compound is selected from phenol and resorcinol.

7. Difficultly flammable coated chip boards as claimed in claim 1, wherein the special binder used for applying the veneer of wood or laminated sheet material is a condensation product based on phenol/melamine/urea-formaldehyde or an isocyanate.

* * * * *

UNITED STATES PATENT AND TRADEMARK OFFICE
CERTIFICATE OF CORRECTION

PATENT NO. : 4,701,373
DATED      : October 20, 1987
INVENTOR(S): Fritz-Reichard Fuchs et al It is certified that error appears in the above-identified patent and that said Letters Patent is hereby corrected as shown below:

On cover page of patent Section [73] should read as follows:

-- [73] Assignee: Hoechst Aktiengesellschaft,
                      Frankfurt am Main, Fed. Rep. of Germany
                      Karl Danzer Furnierwerke,
                                        Fed. Rep. of Germany --

On cover page of patent Section [30] should read as follows:

-- [30]     Foreign Application Priority Data
       Nov. 5, 1983 [DE]   Fed. Rep. of Germany ...3340080
       May 5, 1984  [DE]   Fed. Rep. of Germany ...3416662
       Oct. 5, 1984 [DE]   Fed. Rep. of Germany ...3436507--

Signed and Sealed this

Twenty-eighth Day of June, 1988

Attest:

DONALD J. QUIGG

*Attesting Officer*         *Commissioner of Patents and Trademarks*